United States Patent
Hyon et al.

(10) Patent No.: US 9,107,079 B2
(45) Date of Patent: Aug. 11, 2015

(54) ULTRA-LOW POWER WIRELESS COMMUNICATION APPARATUS AND METHOD

(71) Applicant: SAMSUNG ELECTRONICS CO., LTD., Suwon-si (KR)

(72) Inventors: Tae In Hyon, Hwaseong-si (KR); Young Jun Hong, Seoul (KR); Jae Sup Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 200 days.

(21) Appl. No.: 13/772,078

(22) Filed: Feb. 20, 2013

(65) Prior Publication Data

US 2013/0252553 A1 Sep. 26, 2013

(30) Foreign Application Priority Data

Mar. 23, 2012 (KR) .................. 10-2012-0030144

(51) Int. Cl.
*H04B 1/00* (2006.01)
*H04B 15/00* (2006.01)
*H04B 7/00* (2006.01)
*H04W 16/14* (2009.01)

(52) U.S. Cl.
CPC .............. *H04W 16/14* (2013.01); *Y02B 60/50* (2013.01)

(58) Field of Classification Search
USPC ............ 455/450, 452.1, 509, 512, 513, 63.1, 455/63.3
See application file for complete search history.

(56) References Cited

U.S. PATENT DOCUMENTS

| | | | |
|---|---|---|---|
| 6,298,081 B1 * | 10/2001 | Almgren et al. ............... 375/132 |
| 7,373,162 B2 | 5/2008 | Farnham et al. | |
| 2001/0053139 A1 * | 12/2001 | Zimmermann et al. ...... 370/332 |
| 2007/0217455 A1 | 9/2007 | Haeusler | |
| 2008/0019324 A1 * | 1/2008 | Matsumoto et al. .......... 370/335 |
| 2012/0172075 A1 * | 7/2012 | Hyon et al. .................... 455/501 |
| 2013/0029606 A1 * | 1/2013 | Wang et al. ..................... 455/62 |

FOREIGN PATENT DOCUMENTS

| | | |
|---|---|---|
| KR | 10-0722976 B1 | 5/2007 |
| KR | 10-1010841 B1 | 1/2011 |
| WO | WO-2011/010755 A1 | 1/2011 |

* cited by examiner

*Primary Examiner* — Nguyen Vo

(74) *Attorney, Agent, or Firm* — NSIP Law

(57) ABSTRACT

An ultra-low power wireless communication apparatus and an ultra-low power wireless communication method are provided. The ultra-low power wireless communication apparatus includes a sensing unit configured to sense state information of frequency channels in a frequency band. The ultra-low power wireless communication apparatus further includes a channel determining unit configured to divide the frequency band into frequency bands based on an allowable output power, assign a priority to one of the frequency bands that includes an output power that is less than or equal to the allowable output power, and determine a communication channel based on the state information of the frequency channels.

19 Claims, 5 Drawing Sheets

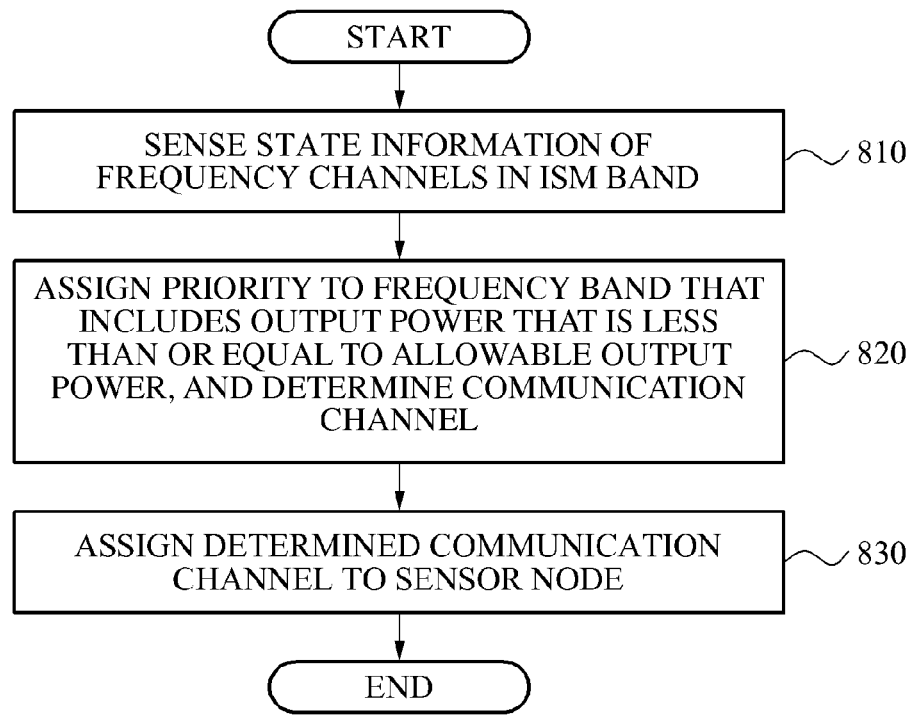

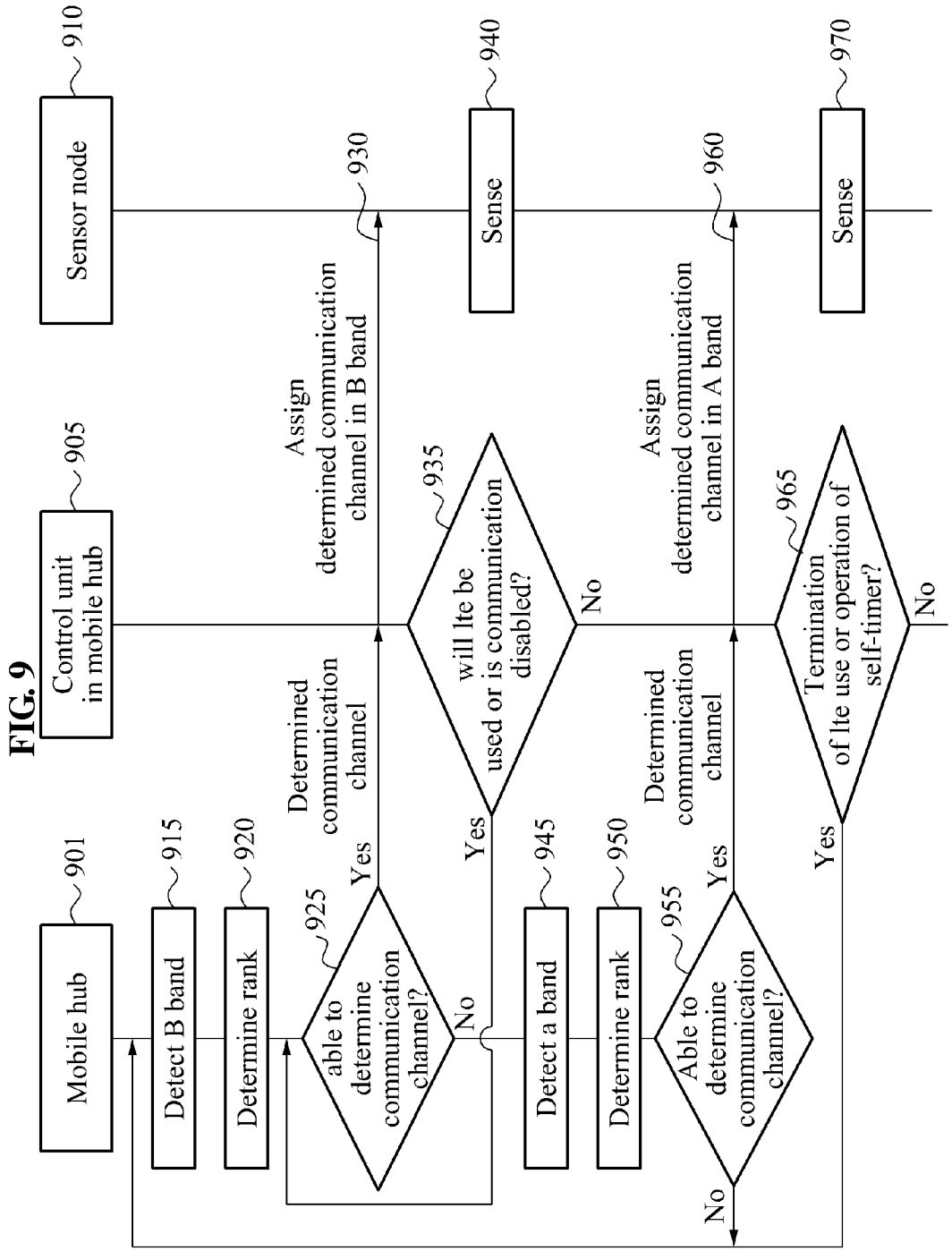

ULTRA-LOW POWER WIRELESS COMMUNICATION APPARATUS AND METHOD

CROSS-REFERENCE TO RELATED APPLICATION(S)

This application claims the benefit under 35 U.S.C. §119 (a) of Korean Patent Application No. 10-2012-0030144, filed on Mar. 23, 2012, in the Korean Intellectual Property Office, the entire disclosure of which is incorporated herein by reference for all purposes.

BACKGROUND

1. Field

The following description relates to an ultra-low power wireless communication apparatus and an ultra-low power wireless communication method.

2. Description of Related Art

Ultra-low power communication is susceptible to interference. Accordingly, avoiding interference to improve reliability is an issue for ultra-low power communication. For example, in the industrial scientific medical (ISM) band, various services using various power and frequency bands are occupied, and thus, introducing an ultra-low power service, e.g., a medical communication application service, is not easily accomplished. That is, due to a relatively high transmission power of existing services being used in the ISM band, obtaining a desired quality of service (QoS) is rather complex when ultra-low power communication is attempted in the same frequency band.

Also, when communication of a relatively high power application service, for example, a wireless local area network (WLAN), occurs during ultra-low power communication in the same frequency band out of interference, a high possibility may exist for the ultra-low power communication to be disconnected. Further, since a ratio of a bandwidth of a frequency band used by an existing service to a bandwidth of available frequency bands is high, locating a frequency band causing interference is problematic. For example, in the case of a WLAN using a highest power, since a bandwidth of a channel is in a range of 22 to 40 megahertz (MHz), most available channels are occupied by a relatively low number of channels.

Accordingly, there is a need for a frequency sharing technology that detects interference or collision in the ISM band to enable ultra-low power communication in the ISM band.

SUMMARY

In one general aspect, there is provided an ultra-low power wireless communication apparatus including a sensing unit configured to sense state information of frequency channels in a frequency band. The ultra-low power wireless communication apparatus further includes a channel determining unit configured to divide the frequency band into frequency bands based on an allowable output power, assign a priority to one of the frequency bands that includes an output power that is less than or equal to the allowable output power, and determine a communication channel based on the state information of the frequency channels.

In another general aspect, there is provided an ultra-low power wireless communication method including sensing state information of frequency channels in a frequency band. The ultra-low power wireless communication method further includes dividing the frequency band into frequency bands based on an allowable output power. The ultra-low power wireless communication method further includes assigning a priority to one of the frequency bands that includes an output power that is less than or equal to the allowable output power. The ultra-low power wireless communication method further includes determining a communication channel based on the state information of the frequency channels.

Other features and aspects will be apparent from the following detailed description, the drawings, and the claims.

BRIEF DESCRIPTION OF THE DRAWINGS

FIG. 7 is a table illustrating an example of a result of ranking frequency channels in an ultra-low power wireless communication apparatus.

FIG. 8 is a flowchart illustrating an example of an ultra-low power wireless communication method.

FIG. 9 is a swim lane diagram illustrating an example of an operational flow of components included in an ultra-low power wireless communication system.

Figure 1:
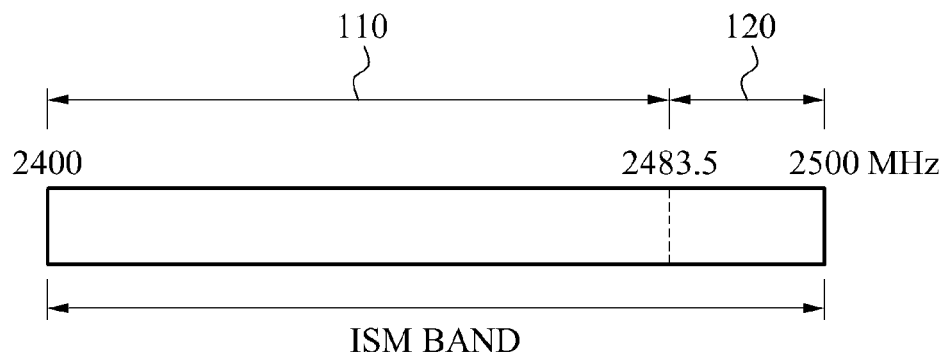
FIG. 1 is a diagram illustrating an example of the industrial scientific medical (ISM) band.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, description of well-known functions and constructions may be omitted for increased clarity and conciseness.

FIG. 1 is a diagram illustrating an example of the industrial scientific medical (ISM) band. Referring to FIG. 1, the ISM band includes a frequency band 110 in a range of 2400 to 2483.5 megahertz (MHz) and a frequency band 120 in a range of 2483.5 to 2500 MHz. Hereinafter, the frequency band 110 is referred to as an A band, and the frequency band 120 is referred to as a B band. The ISM band may be divided into the A band and the B band based on a predetermined allowable output power.

In the A band, a wireless local area network (WLAN), Bluetooth, and Zigbee communication schemes may be used. Since an output power of a WLAN device is relatively high, for example, 40 milliwatts (mW) or more, an ultra-low power wireless communication system may experience a relatively large amount of interference near a frequency channel used by the WLAN device. Since an output power of a Bluetooth device may be 2 mW or greater, and an output power of a Zigbee device may be 3 mW or greater, the ultra-low power wireless communication system may also experience a relatively large amount of interference near frequency channels used by the Bluetooth and Zigbee devices.

Since a long term evolution (LTE) band 7, in a range of 2500 to 2570 MHz for an uplink, borders the ISM band, there exists a possibility that interference may occur between communication schemes of the LTE and ISM bands. That is, since an output power of a LTE device may be 200 mW, interference may occur in an adjacent band.

An ultra-low power wireless communication apparatus enables an ultra-low power wireless communication using the A band and the B band. Hereinafter, a scheme of determining and utilizing an available frequency channel among frequency channels in the A band and the B band is described with reference to FIG. 2.

Figure 2:
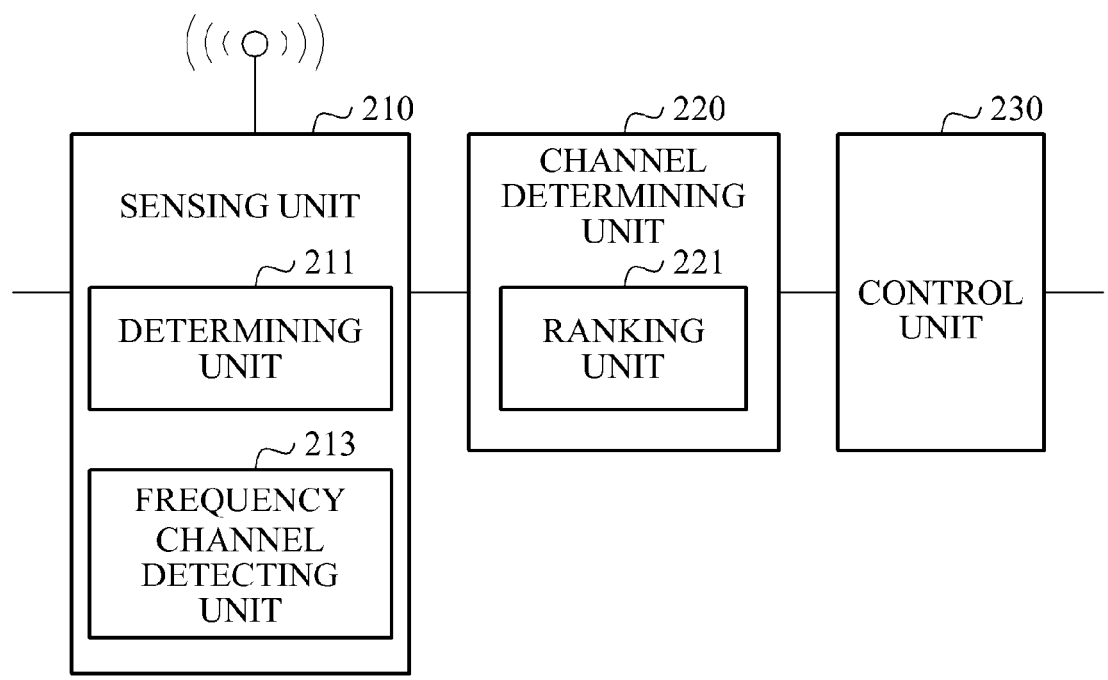
FIG. 2 is a block diagram illustrating an example of an ultra-low power wireless communication apparatus.

FIG. 2 is a block diagram illustrating an example of an ultra-low power wireless communication apparatus. Referring to FIG. 2, the ultra-low power wireless communication apparatus includes a sensing unit 210, a channel determining unit 220, and a control unit 230.

The sensing unit 210 senses state information of frequency channels in the ISM band. The ISM band may include a frequency band in a range of 2400 to 2500 MHz. The ISM band may be divided into an A band and a B band based on a predetermined allowable output power. The A band may include a frequency band in a range of 2400 to 2483.5 MHz and a maximum allowable output power of 1 watt (W). The B band may include a frequency band in a range of 2483.5 to 2500 MHz and a maximum allowable output power of 0.07 mW. The maximum allowable output powers of the A band and the B band are predetermined by the Federal Communications Commission (FCC).

The A band and the B band may include the frequency channels including respective predetermined bandwidths. Each predetermined bandwidth may be determined based on a type of an application service using an ultra-low power wireless communication.

The sensing unit 210 initially senses the state information of the frequency channels in the B band. Since the maximum allowable output power of the B band may be 0.07 mW, WLAN, Bluetooth, and Zigbee communication schemes are not allowed in the B band. Accordingly, the frequency channels in the B band may experience less interference than the frequency channels in the A band. The state information includes an amount of interference in each of the frequency channels, or information about a strength of an interference signal, in each of the frequency channels. The sensing unit 210 may measure a received signal strength indication (RSSI) level and/or a link quality indicator (LQI) value for each frequency channel to sense the state information.

The sensing unit 210 includes a determining unit 211 and a frequency channel detecting unit 213. The determining unit 211 determines whether each of the frequency channels in the ISM band is occupied by the interference signal (e.g., unavailable) based on whether the strength of the interference signal, in each of the frequency channels in the ISM band, exceeds a predetermined standard.

The determining unit 211 initially determines whether the strength of the interference signal, in each of the frequency channels in a frequency band including an output power that is less than or equal to the predetermined allowable output power, exceeds the predetermined standard. The predetermined allowable output power may be 0.07 mW. Accordingly, the frequency band including the output power that is less than or equal to the predetermined allowable output power may include the B band.

The interference signal in the frequency channels may indicate an RSSI level and/or a LQI value. The predetermined standard may be determined based on a minimum interference level for the ultra-low power wireless communication apparatus to enable a stable communication. Accordingly, the predetermined standard may be determined based on an application service using an ultra-low power wireless communication.

The determining unit 211 determines that at least one of the frequency channels in the B band is occupied by the interference signal when the respective strength of the interference signal, in the at least one of the frequency channels in the B band, exceeds the predetermined standard. Also, the determining unit 211 determines an occupied extent of each of the frequency channels in the B band based on the respective strength of the interference signal, in each of the frequency channels in the B band.

The frequency channel detecting unit 213 detects a predetermined frequency channel experiencing interference among the frequency channels, through frequency sweeping of each frequency channel. In more detail, in the frequency sweeping, the frequency channel detecting unit 213 may detect the predetermined frequency channel, using a phase lock loop (PLL). The determining unit 211 may determine whether the detected frequency channel is experiencing interference. In the frequency sweeping, the determining unit 211 may sense the strength of the interference signal, in each frequency channel, and may compare the strength to the predetermined standard, to determine whether each frequency channel is experiencing interference.

The channel determining unit 220 divides the ISM band based on the predetermined allowable output power, assigns a priority to the frequency band including the output power less than or equal to the predetermined allowable output power, and determines a communication channel among the frequency channels in the ISM band based on the state information of the frequency channels in the ISM that is sensed by the sensing unit 210. In more detail, the channel determining unit 220 assigns the priority to the B band, and may determine the communication channel to be a frequency channel including the lowest strength of the interference signal that is sensed by the sensing unit 210, among the frequency channels in the ISM band. The ultra-low power wireless communication apparatus performs ultra-low power wireless communication with the determined communication channel.

The channel determining unit 220 includes a ranking unit 221. The ranking unit 221 determines a rank of available frequency channels among frequency channels in a frequency band based on an amount of interference measured in each frequency channel during a predetermined period, or a strength of an interference signal that is measured in each frequency channel. The ranking unit 221 determines an available frequency channel to be a frequency channel including the strength of the interference signal that is less than or equal to the predetermined standard, which is determined by the determining unit 211.

The ranking unit 221 may determine the rank of the available frequency channels further based on a duration of the interference in each frequency channel at a predetermined time, and/or a last interference occurrence time before the predetermined time, of each frequency channel. The duration of the interference and the last interference occurrence may be included in the state information of the frequency channels. The ranking unit 221 may assign different weight values to factors used to determine the rank of the available frequency channels, such as the duration of the interference and the last interference occurrence time. A detailed description of the ranking unit 221 is made below with reference to FIGS. 6 and 7.

The channel determining unit 220 may determine the communication channel to be a highest ranked frequency channel in the rank among available frequency channels in the B band. The channel determining unit 220 may determine the communication channel among the frequency channels in the A band when the rank does not include an available frequency channel in the B band. In this example, the channel determining unit 220 may determine the communication channel to be a highest ranked frequency channel in the rank among available frequency channels in the A band.

While the ultra-low power wireless communication apparatus is using the determined communication channel in the A band, the sensing unit 210 senses the state information of the frequency channels in the B band, the ranking unit 221 may determine the rank of the available frequency channels among the frequency channels based on the sensed state information of the frequency channels in the B band, and the channel determining unit 220 may determine the communication channel to be a highest ranked frequency channel in the rank among the available frequency channels in the B band. When the communication channel in the B band is determined, the channel determining unit 220 changes the communication channel, e.g., has the ultra-low power wireless communication apparatus use the determined communication channel in the B band instead of the determined communication channel in the A band.

The control unit 230 determines the communication channel determined by the channel determining unit 220 to be a communication channel of a sensor node of an ultra-low power wireless communication system. That is, the control unit 230 assigns the communication channel determined by the channel determining unit 220 to the sensor node. Accordingly, the ultra-low power wireless communication apparatus performs ultra-low power wireless communication with the sensor node via the determined communication channel.

The control unit 230 predicts whether interference occurs in the B band from a wireless communication system using a predetermined range of frequency channels adjacent to the B band. Since an LTE band 7 for an uplink may border the B band, there exists a possibility that interference may occur in the B band during operation of an LTE communication system. When the ultra-low power wireless communication apparatus is used with an LTE communication module, the control unit 230 obtains an operational schedule of the LTE communication module from a scheduler. Accordingly, the control unit 230 may predict that interference occurs in the B band during LTE communication, and may control operation of the channel determining unit 220 to prevent the channel determining unit 220 from determining the communication channel to be among the available frequency channels in the B band. In contrast, when the ultra-low power wireless communication apparatus is used separately from the LTE communication module, the control unit 230 predicts whether the LTE communication takes place based on the strength of the interference signal, in each of the frequency channels in the B band that is sensed by the sensing unit 210.

When the communication channel is not determined to be one of the frequency channels in the B band, the sensing unit 210 senses the state information of the frequency channels in the A band. The channel determining unit 220 may determine the communication channel to be a frequency channel including the lowest strength of the interference signal among the frequency channels in the A band based on the sensed state information of the frequency channels in the A band.

The control unit 230 determines whether interference occurs in the B-band from another ultra-low power communication system based on the strength of the interference signal, in each of the frequency channels in the B band, that is sensed by the sensing unit 210. Another ultra-low power communication system may include a system that supports an application service supported by the ultra-low power wireless communication apparatus, along with another application service.

The control unit 230 may control a wireless energy transfer apparatus, and may perform functions of the sensing unit 210 and the channel determining unit 220. Although FIG. 2 separately illustrates the sensing unit 210, the channel determining unit 220, and the control unit 230 to distinguish respective functions, the control unit 230 may be implemented to perform all the functions or a portion of the functions.

The ultra-low power wireless communication apparatus may be applied to, for example, a medical communication application service, a smart utility network application service, a smart car application service, and/or other services known to one of ordinary skill in the art. The medical communication application service may support a sensor network including a sensor attached to or inserted into a human body that detects a physiological signal of the body, and a hub that receives the physiological signal from the sensor. The smart utility network application service may include an application service that controls or monitors a long-distance power distribution system, for example, a smart grid. The smart car application service may include an application service using a sensor attached to a component of a car, for example, a tire, an actuator, and/or other components known to one of ordinary skill in the art.

Figure 3:
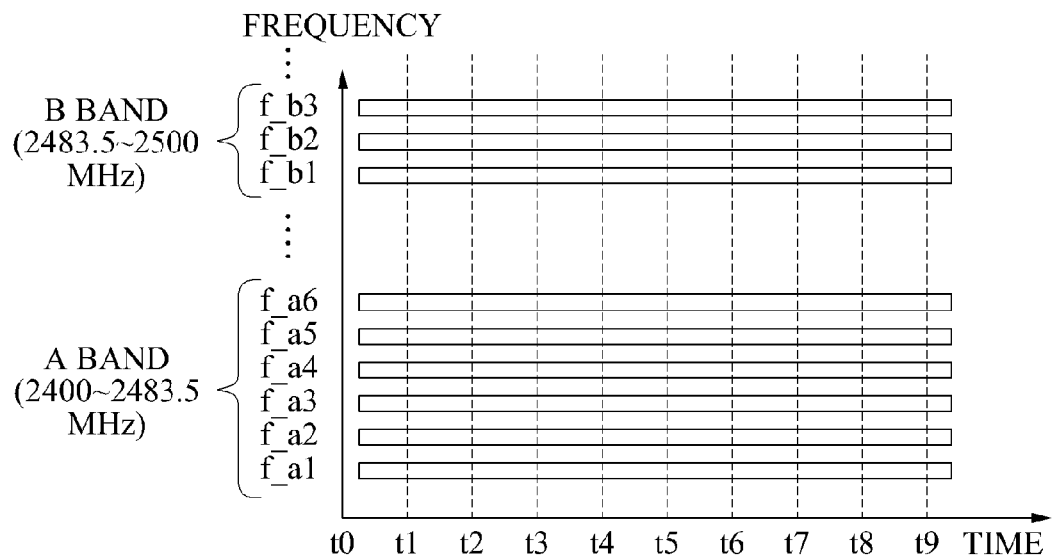
FIG. 3 is a graph illustrating an example of frequency channels in the ISM band used in an ultra-low power wireless communication apparatus.

FIG. 3 is a graph illustrating an example of frequency channels in the ISM band used in an ultra-low power wireless communication apparatus. Referring to FIG. 3, a B band of the ISM band is more limited than an A band of the ISM band in terms of an allowable output power for communication, and thus, may be unable to be used for a WLAN. Accordingly, the B band may experience relatively less interference than the A band in which main application services operate. The FCC regulates the allowable output power of the B band to be less than or equal to 0.07 mW. As such, the B band includes frequency channels including predetermined bandwidths 'f_b1', 'f_b2', and 'f_b3', respectively.

The A band may include a frequency band in which a relatively high output power service, for example, WLAN, Bluetooth, and Zigbee communication schemes, may be allowed. The FCC regulates an effective isotropic radiated power (EIRP) of the A band to be a maximum of 1 W. Accordingly, the A band includes frequency channels including predetermined bandwidths 'f_a1', 'f_a2', 'f_a3', 'f_a4', 'f_a5', and 'f_a6', respectively.

Figure 4:
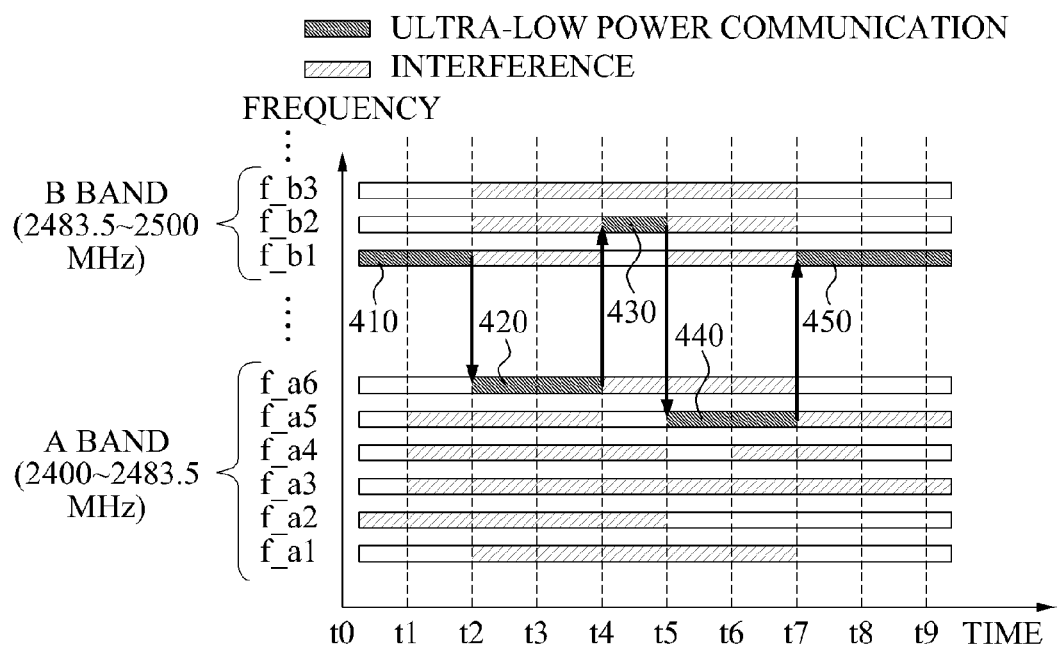
FIG. 4 is a graph illustrating an example of a method of changing a communication channel based on an interference state of frequency channels in an ultra-low power wireless communication apparatus.

FIG. 4 is a graph illustrating an example of a method of changing a communication channel based on an interference state of frequency channels in an ultra-low power wireless communication apparatus. Referring to FIG. 4, the ultra-low power wireless communication apparatus senses a strength of an interference signal, in each of the frequency channels in a B band of the ISM band, and determines a communication channel 410 to be a highest ranked frequency channel 'f_b1' among the frequency channels in the B band. When the frequency channels in the B band include the same rank, the ultra-low power wireless communication apparatus may determine the communication channel 410 to be an arbitrary frequency channel among the frequency channels in the B band. The ultra-low power wireless communication apparatus performs ultra-low power wireless communication with the communication channel 410.

When interference occurs in the communication channel 410 from a nearby LTE communication system or another ultra-low power wireless communication system while the ultra-low power wireless communication apparatus is using the communication channel 410, the ultra-low power wireless communication apparatus senses the strength of the interference signal, in each of the other frequency channels in the B band, and determines another communication channel among the frequency channels in the B band. When the strength of the interference signal, in each of the other frequency channels in the B band, exceeds a predetermined standard, the ultra-low power wireless communication apparatus senses a strength of an interference signal, in each of the frequency channels in an A band of the ISM band. The ultra-low power wireless communication apparatus determines a communication channel 420 to be a frequency channel 'f_a6' that is free of interference, among the frequency channels in the A band. The ultra-low power wireless communication apparatus performs the ultra-low power wireless communication with the communication channel 420.

The ultra-low power wireless communication apparatus monitors the B band while the ultra-low power wireless communication apparatus is using the communication channel 420. When a frequency channel 'f_b2' including the strength of the interference signal that is less than or equal to the predetermined standard is sensed among the frequency channels in the B band, the ultra-low power wireless communication apparatus determines a communication channel 430 to be the frequency channel 'f_b2'. The ultra-low power wireless communication apparatus performs the ultra-low power wireless communication with the communication channel 430.

When a problem occurs in communication channel 430 while the ultra-low power wireless communication apparatus is using the communication channel 430, the ultra-low power wireless communication apparatus initially searches for an available frequency channel in the B band, and then searches for an available frequency channel in the A band. The communication channel 430 determines a communication channel 440 to be a frequency channel 'f_a5' that is free of interference among the frequency channels in the A band, and the ultra-low power wireless communication apparatus performs the ultra-low power wireless communication with the communication channel 440.

Subsequently, when the frequency channel 'f_b1' including the strength of the interference signal that is less than or equal to the predetermined standard is sensed among the frequency channels in the B band, the ultra-low power wireless communication apparatus determines a communication channel 450 to be the frequency channel 'f_b1'. The ultra-low power wireless communication apparatus performs the ultra-low power wireless communication with the communication channel 450.

Figure 5:
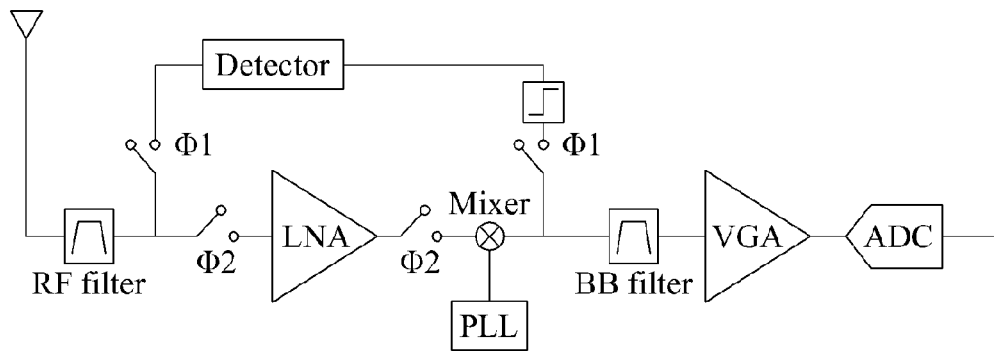
FIG. 5 is a diagram illustrating an example of a sensing unit of the ultra-low power wireless communication apparatus of FIG. 2.

FIG. 5 is a diagram illustrating an example of the sensing unit 210 of the ultra-low power wireless communication apparatus of FIG. 2. Referring to FIG. 5, the sensing unit 210 performs a two-stage operation. The sensing unit 210 includes a radio frequency (RF) filter that receives a signal through an antenna, and that filters the signal.

In a first stage, or a Φ1 state, the sensing unit 210 includes a detector and a determiner connected in series to the detector. The detector detects an interference signal in a corresponding frequency channel, and a determiner determines an occupied state of the frequency channel based on whether a strength of the interference signal exceeds a predetermined standard.

In a second stage, or a Φ2 state, the sensing unit 210 includes a low noise amplifier (LNA), a mixer, and a PLL. The LNA amplifies the filtered signal by a predetermined strength, and the mixer performs frequency sweeping on the amplified signal to detect a predetermined frequency channel experiencing interference, using the PLL.

The sensing unit 210 further includes a baseband (BB) filter, a variable gain amplifier (VGA), and an analog-to-digital converter (ADC). The BB filter converts the predetermined frequency channel into a baseband channel, and the VGA and the ADC converts the baseband channel into a processible signal.

Figure 6:
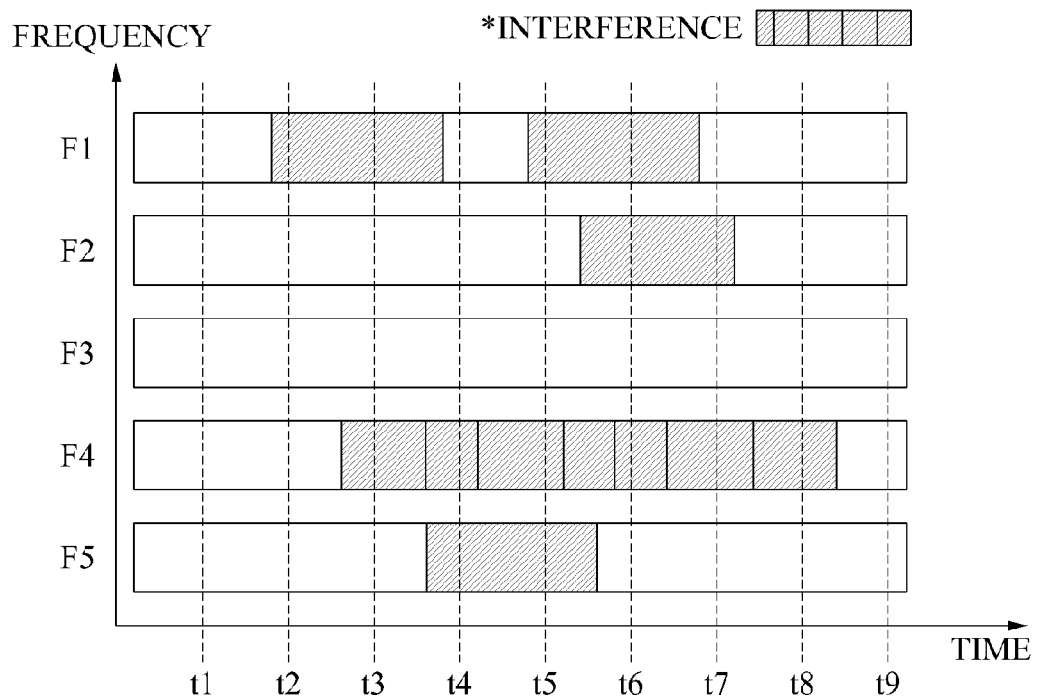
FIG. 6 is a graph illustrating an example of an interference detection result of frequency channels in an ultra-low power wireless communication apparatus.

FIG. 6 is a graph illustrating an example of an interference detection result of frequency channels in an ultra-low power wireless communication apparatus. Referring to FIG. 6, an interference in each of frequency channels F1 through F5 over time is shown. The interference of each in the frequency channels F1 through F5 may occur at each of times 't1' through 't9'. On a time-sequential basis, interference first occurs in the frequency channel F1. If the frequency channel F1 is a frequency channel in an A band of the ISM band, the interference in the frequency channel F1 may include interference from various application services, for example, WLAN, Bluetooth, and Zigbee communication schemes. If the frequency channel F1 is a frequency channel in a B band of the ISM band, the interference in the frequency channel F1 may include interference from a nearby LTE communication system or another ultra-low power wireless communication system. In the frequency channel F3, interference does not occur at any of the times 't1' through 't9'.

FIG. 7 is a table illustrating an example of a ranking result of frequency channels in an ultra-low power wireless communication apparatus. Referring to FIG. 7, a rank of each of the frequency channels F1 through F5 of FIG. 6 is shown at each of the times 't1' through 't9'. A rank of each of frequency channels may be determined based on the example of Equation 1:

$$\text{If\_level}(t,f,\text{win})=k1*(\text{duration})+k2*(1/\text{since}), \text{since} \neq 0 \qquad (1)$$

In Equation 1, 'If_level' denotes a rank level of a frequency channel 'f', 'duration' denotes a duration of an interference in the frequency channel 'f' during a window time 'win' at a predetermined time 't', 'since' denotes a last interference occurrence time before the predetermined time 't', of the frequency channel 'f', and k1 and k2 denote weight values. The weight values k1 and k2 may be determined based on a type of an application service. In FIG. 7, k1 is 5, and k2 is 1. The greater the rank level 'If_level' of the frequency channel 'f', the lower the rank of the frequency channel 'f'.

The rank of each of the frequency channels F1 through F5 at each of the times 't1' through 't9' is described with reference to the graph of FIG. 6. Since interference does not occur in any of the frequency channels F1 through F5 at the time 't1', the ultra-low power wireless communication apparatus may determine a communication channel to be any of the frequency channels F1 through F5. That is, the frequency channels F1 through F5 are available. When the same rank level is determined for each of the frequency channels F1 through F5, as in this example, the rank of each of the frequency channels F1 through F5 is determined in an order of the frequency channels F1 through F5, as shown in FIG. 7. Accordingly, the frequency channel F1 is ranked highest.

Since interference occurs in the frequency channel F1 at the time 't2', any of the frequency channels F2 through F5 may be determined to be the communication channel. Accordingly, the frequency channel F2 rather than the frequency channel F1 is ranked highest.

Since interference occurs in the frequency channels F1 and F4 at the time 't3', frequency channels F2, F3, and F5 may be determined to be the communication channel. Since a duration of the interference in the frequency channel F1 at the time 't3' is longer than a duration of the interference in the frequency channel F4 at the time 't3', the frequency channel F4 is ranked higher than the frequency channel F1. In this example, the frequency channel F2 is ranked highest. In the same manner, the rank of each of the frequency channels F1 through F5 at each of times 't4' through 't9' is determined.

The ultra-low power wireless communication apparatus may determine the communication channel to be any one of available (e.g., interference-free) frequency channels. The ultra-low power wireless communication apparatus may determine the communication channel to be a highest ranked frequency channel among the available frequency channels.

FIG. 8 is a flowchart illustrating an example of an ultra-low power wireless communication method. For example, the ultra-low power wireless communication method may be performed by the ultra-low power wireless communication apparatus of FIG. 2.

In operation 810, the ultra-low power wireless communication apparatus senses state information of frequency channels in the ISM band. The ultra-low power wireless communication apparatus may determine whether each of the frequency channels is occupied by an interference signal based on whether a respective strength of the interference signal, in each of the frequency channels, exceeds a predetermined standard. The ultra-low power wireless communication apparatus may detect a predetermined frequency channel experiencing interference among the frequency channels, through frequency sweeping of each frequency channel.

In operation 820, the ultra-low power wireless communication apparatus divides the ISM band based on a predetermined allowable output power, assigns a priority to a frequency band of the ISM band that includes an output power that is less than or equal to the predetermined allowable output power, and determines a communication channel among the frequency channels based on the state information of the frequency channels. The ultra-low power wireless communication apparatus may determine a rank of available frequency channels among the frequency channels based on an amount of interference measured in each frequency channel during a predetermined period, a duration of interference in each frequency channel at a predetermined time, and/or a last interference occurrence time before the predetermined time, of each frequency channel. The ultra-low power wireless communication apparatus may determine the communication channel based on the rank.

In operation 830, the ultra-low power wireless communication apparatus determines the determined communication channel to be a communication channel of a sensor node, and assigns the determined communication channel to the sensor node.

FIG. 9 is a swim lane diagram illustrating an example of an operational flow of components included in an ultra-low power wireless communication system. Referring to FIG. 9, the ultra-low power wireless communication system includes a mobile hub 901 and a sensor node 910, as the components. The mobile hub 901 includes a control unit 905 mounted therein that controls operation of the mobile hub 901 after a communication channel is determined.

In operation 915, the mobile hub 901 detects state information of frequency channels in a B band of the ISM band. For example, the mobile hub 901 may sense a strength of an interference signal, in each of the frequency channels in the B band. The ISM band may be divided into an A band and the B band based on a predetermined allowable output power. The A band may include a frequency band in the range of 2400 to 2483.5 MHz and a maximum allowable output power of 1 W. The B band may include a frequency band in a range of 2483.5 to 2500 MHz and a maximum allowable output power of 0.07 mW.

In operation 920, the mobile hub 901 determines a rank of available frequency channels among frequency channels in the B band based on, e.g., the strength of the interference signal, in each of the frequency channels in the B band. The mobile hub 901 may determine an available frequency channel to be a frequency channel including the respective strength of the interference signal that is less than or equal to a predetermined standard.

In operation 925, the mobile hub 901 determines whether the mobile hub 901 is able to determine a communication channel based on the rank. When the rank is absent, or does not include an available frequency channel in the B band, the mobile hub 901 determines that the mobile hub 901 is unable to determine the communication channel, and the method continues in operation 945. When the rank is not absent, the mobile hub 901 determines that the mobile hub 901 is able to determine the communication channel, and determines the communication channel to be a highest ranked frequency channel among the available frequency channels in the B band that are included in the rank, and the method continues in operation 930.

In operation 930, the control unit 905 assigns the determined communication channel in the B band to the sensor node 910.

In operation 935, the control unit 905 determines whether an LTE communication system is being used in a frequency channel adjacent to the B band, or whether communication is disabled in the determined communication channel. The control unit 905 may determine whether the LTE communication system is being used based on a strength of an interference signal, in the determined communication channel. When the LTE communication system is being used, or the communication is disabled, the mobile hub 901 determines whether the mobile hub 901 is able to determine another communication channel based on the rank, e.g., the method returns to operation 925. Otherwise, the method continues in operation 965.

In operation 940, the sensor node 910 executes a sensing task based on a type of an application service, and transmits sensing information to the mobile hub 901, using the determined communication channel in the B band.

In operation 945, the mobile hub 901 detects state information of the frequency channels in the A band. For example, the mobile hub 901 may sense a strength of an interference signal, in each of the frequency channels in the A band.

In operation 950, the mobile hub 901 determines a rank of available frequency channels among the frequency channels in the A band based on, e.g., the strength of the interference signal, in each of the frequency channels in the A band. The mobile hub 901 may determine an available frequency channel to be a frequency channel including the respective strength of the interference signal that is less than or equal to the predetermined standard.

In operation 955, the mobile hub 901 determines whether the mobile hub 901 is able to determine a communication channel based on the rank. When the rank is absent, or does not include an available frequency channel in the A band, the mobile hub 901 determines that the mobile hub 901 is unable to determine the communication channel, and the method returns to operation 915. When the rank determined in 950 is not absent, the mobile hub 901 determines that the mobile hub 901 is able to determine the communication channel, and determines the communication channel to be a highest ranked frequency channel among the available frequency channels in the A band that are included in the rank, and the method continues in operation 960.

In operation 960, the control unit 905 assigns the determined communication channel in the A band to the sensor node 910.

In operation 965, the control unit 905 determines whether use of the LTE communication system is terminated in the frequency channel adjacent to the B band, or whether a self-timer is operational, e.g., whether a predetermined period of time passes. When the use of the LTE communication system is terminated, or when the predetermined period of time passes, as determined by the operation of the self-timer, the mobile hub 901 detects the state information of the frequency channels in the B band again, e.g., the method returns to operation 915. Otherwise, the method ends.

In operation 970, the sensor node 910 executes the sensing task based on a type of an application service, and transmits the sensing information to the mobile hub 901, using the determined communication channel in the A band.

According to the teachings above, there is provided in the ISM band, a band including an allowable output power less than or equal to a predetermined value that is initially used for an ultra-low power wireless communication, thereby reducing interference in the ultra-low power wireless communication. In more detail, an ultra-low power wireless communication apparatus determines a communication channel to be a frequency channel experiencing less interference among frequency channels in the ISM band. To determine the communication channel, the ultra-low power wireless communication apparatus initially checks an interference state of frequency channels in the frequency band including the allowable output power less than or equal to the predetermined value, and determines a rank of available frequency channels in such a frequency band.

When an available frequency channel is absent in the frequency band including the allowable output power less than or equal to the predetermined value, the ultra-low power wireless communication apparatus determines the communication channel to be a frequency channel including a lowest strength in an interference signal that is in a frequency band including an allowable output power exceeding the predetermined value. Also, the ultra-low power wireless communication apparatus may monitor frequency channels in the frequency band including the allowable output power less than or equal to the predetermined value. When an available frequency channel is detected in the frequency band including the allowable output power characteristic less than or equal to the predetermined value, the ultra-low power wireless communication apparatus changes the communication channel to such an available frequency channel.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable recording mediums. The computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments that accomplish the examples disclosed herein can be easily construed by programmers skilled in the art to which the examples pertain based on and using the flow diagrams and block diagrams of the figures and their corresponding descriptions as provided herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An ultra-low power wireless communication apparatus comprising:
   a sensing unit configured to sense state information of frequency channels in a first frequency band, wherein the state information comprises an amount of interference in each of the frequency channels; and
   a channel determining unit, comprising a ranking unit configured to determine a rank of available frequency channels among the frequency channels, based on the amount of the interference in each of the frequency channels during a predetermined period, and wherein the channel determining unit is configured to:
- divide the first frequency band into second frequency bands, based on a respective allowable output power of each second frequency band,
- assign a priority to a second frequency band among the second frequency bands, wherein the prioritized second frequency band comprises an output power that is less than or equal to the allowable output power,
- determine whether or not the rank includes an available frequency channel in the prioritized second frequency band, and
- upon determining that the rank includes an available frequency channel in the prioritized second frequency band, determine a communication channel from frequency channels in the prioritized second frequency band, based on the state information of the plurality of frequency channels in the prioritized second frequency band, and
- upon determining that the rank does not include an available frequency channel in the prioritized second frequency band, determine a communication channel from frequency channels in another second frequency band, wherein the another second frequency band comprising an output power exceeding the allowable output power.

2. The ultra-low power wireless communication apparatus of claim 1, wherein the first frequency band comprises an industrial scientific medical (ISM) band.

3. The apparatus of claim 1, further comprising:
a control unit configured to
- determine the determined communication channel to be a communication channel of a sensor node, and
- assign the determined communication channel to the sensor node.

4. The apparatus of claim 1, wherein:
the state information comprises a strength of an interference signal in each of the frequency channels; and
the sensing unit comprises a determining unit configured to determine whether each of the frequency channels is occupied by the interference signal, based on whether the respective strength of the interference signal exceeds a predetermined standard in each of the frequency channels.

5. The apparatus of claim 4, wherein the determining unit is further configured to:
initially determine whether the strength of the interference signal exceeds the predetermined standard, in each of the frequency channels in the second frequency band comprising output power that is less than or equal to the allowable output power.

6. The apparatus of claim 1, wherein the sensing unit comprises:
a frequency channel detecting unit configured to detect a frequency channel experiencing interference, through frequency sweeping of each of the frequency channels.

7. The apparatus of claim 1, wherein:
the state information further comprises a duration of the interference, in each of the frequency channels at a predetermined time, or a last interference occurrence time before the predetermined time, in each of the frequency channels, or any combination thereof; and
the ranking unit is further configured to determine the rank further based on the duration of the interference, or the last interference occurrence times, or any combination thereof.

8. The apparatus of claim 1, wherein the channel determining unit is further configured to:
determine the communication channel to be a highest ranked frequency channel in the rank among the available frequency channels in the second frequency band comprising output power that is less than or equal to the allowable output power.

9. The apparatus of claim 1, wherein the channel determining unit is further configured to:
determine the communication channel to be a highest ranked frequency channel in the rank among the available frequency channels in another second frequency band comprising an output power exceeding the allowable output power, if the rank does not comprise an available frequency channel in the second frequency band comprising output power that is less than or equal to the allowable output power.

10. The apparatus of claim 9, wherein:
the sensing unit is further configured to sense the state information of frequency channels in the second frequency band comprising output power that is less than or equal to the allowable output power, while the ultra-low power wireless communication apparatus is using the determined communication channel in the another second frequency band comprising output power exceeding the allowable output power;
the ranking unit is further configured to determine the rank of the available frequency channels based on the state information of the frequency channels in the second frequency band comprising output power that is less than or equal to the allowable output power; and
the channel determining unit is further configured to determine the communication channel to be a highest ranked frequency channel in the rank among the available frequency channels in the second frequency band comprising output power that is less than or equal to the allowable output power.

11. The apparatus of claim 1, further comprising:
a control unit configured to predict whether interference occurs in the second frequency band comprising output power that is less than or equal to the allowable output power, from a wireless communication system using a frequency channel adjacent to the second frequency band.

12. The apparatus of claim 1, further comprising:
a control unit configured to determine whether interference occurs in the second frequency band comprising output power that is less than or equal to the allowable output power, from an ultra-low power communication system.

13. The apparatus of claim 1, wherein the allowable output power is 0.07 milliwatts (mW).

14. An ultra-low power wireless communication method comprising:
sensing state information of frequency channels in a first frequency band, wherein the state information comprises an amount of interference in each of the frequency channels;
determining a rank of available frequency channels, based on the amount of the interference in each of the frequency channels during a predetermined period;
dividing the first frequency band into second frequency bands, based on a respective allowable output power of each second frequency band;
assigning a priority to a second frequency band among the second frequency bands, wherein the prioritized second frequency band comprises an output power that is less than or equal to the allowable output power;

determining whether or not the rank includes an available frequency channel in the prioritized second frequency band, and upon determining that the rank includes an available frequency channel in the prioritized second frequency band, determining a communication channel from frequency channels in the prioritized second frequency band, based on the state information of the frequency channels in the prioritized second frequency band, and upon determining that the rank does not include an available frequency channel in the prioritized second frequency band, determining a communication channel from frequency channels in another second frequency band, wherein the another second frequency band comprises an output power exceeding the allowable output power.

15. The method of claim 14, further comprising:

determining the determined communication channel to be a communication channel of a sensor node; and assigning the determined communication channel to the sensor node.

16. The method of claim 14, wherein:

the state information comprises a strength of an interference signal, in each of the frequency channels; and the method further comprises
   determining whether each of the frequency channels is occupied by the interference signal, based on whether the respective strength of the interference signal, in each of the frequency channels, exceeds a predetermined standard, and
   detecting a frequency channel experiencing interference, through frequency sweeping of each of the frequency channels.

17. The method of claim 14, wherein:

the state information further comprises a duration of the interference, in each of the frequency channels at a predetermined time, or a last interference occurrence time before the predetermined time, of each of the frequency channels, or any combination thereof; and the method further comprises determining the rank further based on the duration of the interference, or the last interference occurrence time, or any combination thereof.

18. The method of claim 14, further comprising:

determining the communication channel to be a highest ranked frequency channel in the rank among the available frequency channels in another second frequency band comprising an output power exceeding the allowable output power, if the rank does not comprise an available frequency channel in the second frequency band comprising output power that is less than or equal to the allowable output power.

19. The method of claim 18, wherein:

sensing state information further comprises sensing the state information of frequency channels in the second frequency band comprising output power that is less than or equal to the allowable output power, while the method is using the determined communication channel in the another second frequency band comprising output power exceeding the allowable output power;

determining a rank of available frequency channels further comprises determining the rank of the available frequency channels based on the state information of the frequency channels in the second frequency band comprising output power that is less than or equal to the allowable output power; and determining a communication channel further comprises determining the communication channel to be a highest ranked frequency channel in the rank among the available frequency channels in the second frequency band comprising output power that is less than or equal to the allowable output power.

* * * * *